Nov. 2, 1965

T. W. NICHOLS ETAL    3,215,876

GENERATOR UNITS INCLUDING PROVISION FOR
GENERATING FROM FLUX LEAKAGE

Filed April 22, 1963

TALLEY W. NICHOLS &
WILLIAM W. WARDLOW,
INVENTORS.

BY C. M. Kucera
   Robert J. Peter
   ATTORNEYS.

Nov. 2, 1965　　　T. W. NICHOLS ETAL　　　3,215,876
GENERATOR UNITS INCLUDING PROVISION FOR
GENERATING FROM FLUX LEAKAGE
Filed April 22, 1963　　　　　　　　　　　　　2 Sheets-Sheet 2

TALLEY W. NICHOLS &
WILLIAM W. WARDLOW,
INVENTORS.

BY C. M. Kucera
Robert J. Peter
ATTORNEYS.

United States Patent Office 3,215,876
Patented Nov. 2, 1965

3,215,876
GENERATOR UNITS INCLUDING PROVISION
FOR GENERATING FROM FLUX LEAKAGE
Talley W. Nichols and William W. Wardlow, Jacksonville, Tex., assignors to Nichols Industries, Inc., Jacksonville, Tex., a corporation of Texas
Filed Apr. 22, 1963, Ser. No. 274,738
10 Claims. (Cl. 310—156)

This invention relates generally to generator units, and, more particularly, to new and improved portable alternating current generator units.

It is an object of this invention to provide a new and improved generator unit which is compact, efficient, and light in weight.

Another object of the invention is the provision of a new and improved arrangement of components of a generator unit.

Another object of the invention is the provision of a generator unit having a new and improved electrical circuitry.

Another object of the invention is the provision of a new and improved alternator for a generator unit.

Another object of the invention is the provision of a new and improved construction for an alternator in order to eliminate eddy currents.

Another object of the invention is the provision of a new and improved coil configuration for use in an alternator, and a method of making such coil.

Another object of the invention is the provision of a new and improved alternator having a stationary armature winding and rotating magnet arrangement wherein flux leakage is utilized to enhance the generating capacity of the alternator.

Another object of the invention is the provision of a new and improved generator construction highly adapted for miniaturization.

Another object of the invention is the provision of a new and improved portable generator unit with features facilitating refueling, adjustment, and starting.

Other and further objects of the invention will be obvious upon an understanding of the illustrative embodiment about to be described, or will be indicated in the appended claims, and various advantages not referred to herein will occur to those skilled in the art upon employment of the invention in practice.

A preferred embodiment of the invention has been chosen for purposes of illustration and description. The preferred embodiment illustrated is not intended as exhaustive nor to limit the invention to the precise form disclosed. It is chosen and described in order to best explain the principles of the invention and its applications in practical use to thereby enable others skilled in the art to best utilize the invention in various embodiments and modifications as may be best adapted to the particular uses contemplated.

Figures 1, 2:
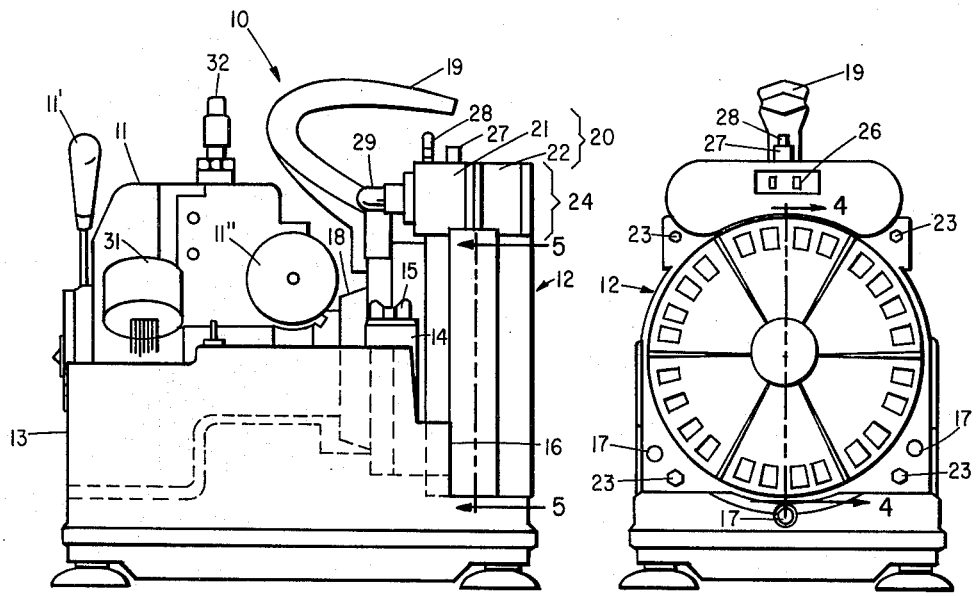
FIGURE 1 is a side elevational view of a portable generator unit.
FIGURE 2 is an end view of the generator unit shown in FIG. 1.
Figures 3, 9:
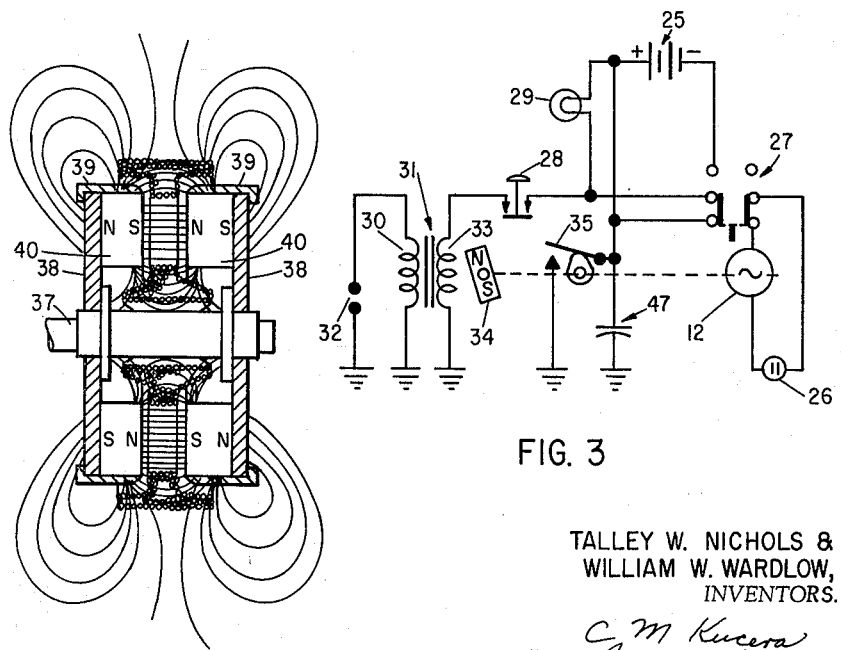
FIGURE 3 is a wiring diagram showing the electrical circuitry employed in the generator unit.
FIGURE 9 is a view similar to FIG. 4, but with the housing removed to more clearly illustrate the relationship of the wires of the armature windings with respect to the flux lines of the magnetic field of the generator.

Referring to FIGS. 1, 2, and 3, the portable generator unit is shown generally connected to an electrical generator 12. A plastic fuel tank 13 partially encircles the engine 11 and the generator 12, and is provided with a filler neck 14 having a closure 15. The fuel tank 13 includes supports 16 to which the generator 12 is secured by means of bolts 17. Although the engine is partially encircled by the fuel tank, clearance is maintained at all points therebetween. The engine 11 is cantilevered from the generator 12 by means of a mounting flange 18. A carrying handle 19 is secured to the generator 12.

The generator 12 is enclosed by a housing 20 comprising two mating parts 21 and 22 secured together by bolts 23. The upper portions of the parts 21 and 22 are shaped to provide a compartment 24 adapted to receive batteries 25 which may be standard flash light cells. Mounted on the compartment 24 are a convenience outlet 26, a double pole-double throw switch 27, a kill switch 28 and an electric lamp 29.

The engine 11 may be a two-stroke cycle, spark ignition, single cylinder engine developing about ¾ horsepower at 6300 r.p.m. The high tension voltage for the ignition spark is induced in the secondary coil 30 of magneto 31 and applied to a spark plug 32. The magneto 31 also includes a primary coil 33, a crankshaft-mounted magnet 34 and breaker points 35 which cooperatively function in a well known manner to generate a low voltage current in the primary coil. When this low voltage current is interrupted by the opening of the breaker points, the high tension voltage is induced in the secondary coil 30.

Figure 4:
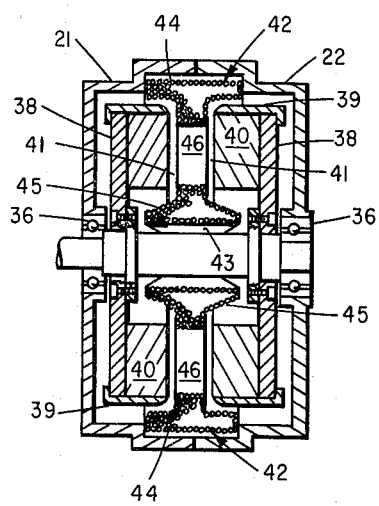
FIGURE 4 is a cross-sectional view taken along line 4—4 in FIG. 2.
Figure 10:
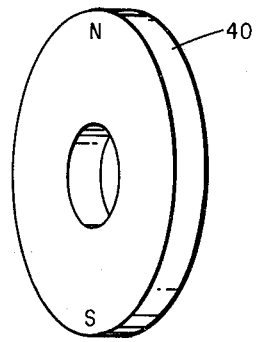
FIGURE 10 is a pictorial view more clearly illustrating the shape and polarization of the magnets utilized in the generator.

As may be seen in FIG. 4, the housing parts 21 and 22 carry bearings 36 in which a steel shaft 37 is rotatably mounted. The shaft has a pair of spaced steel disks 38 mounted thereon, upon each of which is mounted a magnet holder 39 of non-magnetic material and a ring-like magnet 40, all of which rotate with the shaft 37. The magnet may be made of barium ferrite or other suitable material. The steel disks 38 carrying the magnets 40 are axially spaced on the shaft 37 to provide an air gap 41 between the magnets.

Figure 5:
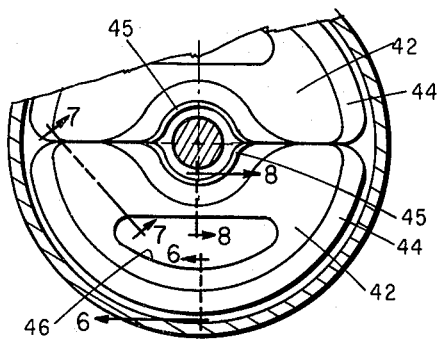
FIGURE 5 is a cross-sectional view taken along line 5—5 in FIG. 1, illustrating the symmetrical arrangement of the armature coils.
Figure 6:
FIGURE 6 is a cross-sectional view taken along line 6—6 in FIG. 5.
Figure 7:
FIGURE 7 is a cross-sectional view taken along line 7—7 in FIG. 5.
Figure 8:
FIGURE 8 is a cross-sectional view taken along line 8—8 in FIG. 5.

The armature winding of the generator 12, comprised of a pair of stationary, series-connected coils 42, is clamped by the housing parts 21 and 22 to axially position the winding in the air gap 41, and to radially position the same to provide clearance 43 with respect to the shaft 37. Each coil of the armature winding is shaped to provide a first enlargement 44 to overlap a portion of the outer periphery of the magnets 40, and a second enlargement 45 to overlap a portion of the inner periphery of the magnets 40. Such armature windings arrangement provides oppositely disposed annular channels in which the spaced, rink-like magnets rotate, as shown in FIGS. 4 and 5. The coils 42 may be constructed by a method comprising the steps of winding a desired number of turns of heat-setting, epoxy resin insulated wire into a coil having a uniform cross-sectional shape, and having an opening therethrough such as is shown at 46 in FIG. 5; then laterally displacing portions of some adjacent turns to variably alter the cross-sectional shape of the coil;

and then fixing the turns of the altered coil with respect to one another by bonding the insulation of adjacent turns.

As may be seen in FIG. 9, a magnetic flux field exists between the magnets 40 with poles arranged as shown. Because of the relative movement between this flux field and the winding, the flux is cut by the windings to produce an electric current. In addition to this flux field existing between the magnets, magnetic leakage flux paths exist which emanate from the periphery of each magnet and return to the steel disk 38 associated with that magnet. Leakage flux also emanates from the bore or inner periphery of each magnet and enters the steel shaft 37 and thence to the steel disk associated with that magnet. This leakage flux would impart no generating capacity to the alternator, but for the overlapping relationship of the armature windings with respect to the magnets as previously described.

As the magnets rotate with the shaft, the leakage flux patterns also rotate with respect to the overlapping portions of the winding which overhang the internal and external peripheries of the magnets. Thus, the leakage flux is cut by the wires or turns in the overhang of the armature and contributes to or enhances the generating capacity of the generator.

Expressed in other words, the two coils of the armature winding are formed in a shape so as to cup about, or overhang the magnets. With the overhang of the armature winding, certain wires or turns thereof are interlinked by the leakage flux, both at the outside and the inside peripheries of each of the magnets. The relative movement between the overhanging wires and the leakage flux enables the cutting of flux lines which would otherwise remain uncut.

This arrangement not only maximizes the number of turns in the coils and the generating capacity of the generator, but also results in minimizing the diameter of the armature winding and, consequently, the overall size of the generator. This is particularly important in portable generating units where maximum wattage output per pound of weight is desirable. Generator units have been designed and built, as disclosed herein, which only weigh 14 pounds and, yet, have a power output in the neighborhood of 300 watts.

As has been brought out, the two parts 21 and 22 of the housing may be formed of plastic, such as a high impact, high strength polystyrene plastic, for example. As is apparent, the leakage flux from the magnets interlink with the material of the housing. If the housing were made of an electrical conducting material, eddy currents would be generated and flow in the material of the housing as a result of the relative movement of the leakage flux interlinking the housing and large valued currents of electricity would be induced and cause the housing material to heat up. This heating energy, of course, can come only from the prime mover motivating the alternator and therefore reduces the useful output of the entire combination. Since the alternator in this disclosure has a plastic case which is a non-conductor, this heating effect is avoided by eliminating the eddy currents. However, the entire housing need not be of plastic—the idea is to break up the eddy current path with insulating materials such as a band of plastic around the central periphery of the alternator housing.

As has been previously described, the generator 12 is bolted to the plastic fuel tank 13, and the engine 11 is in turn cantilever-mounted to the generator with clearance as to the fuel tank. The vibrating engine 11, in being so mounted, is in effect spring-mounted to the generator. Since the generator has a relatively high mass as compared to the source of vibration in the engine, such mass, together with the spring effect of the engine mounting, comprises a low pass mechanical filter which substantially blocks the transmission of high frequency engine vibrations to the fuel tank 13.

Referring to FIG. 3, with the switch 27 in the position shown, a series circuit is completed through the armature winding across the terminals of the convenience outlet 26 and, assuming that the engine is running and the generator 12 is rotating, power is available to a load appliance which may be connected therewith. Also, in this switch position, the primary coil 33 of the magneto 31 is connected with the breaker points 35 of the engine 11. As the magnet 34 rotates, a low voltage current is produced in the primary coil of the magneto. At the point of maximum current flow in the primary coil, the points 35 are opened to interrupt the current to consequently induce a high voltage in the secondary coil 30. This high voltage creates the firing spark for the engine plug 32. A breaker point capacitor 47 is bridged across the breaker points in a conventional manner. A normally closed push button kill switch 28 is conveniently provided in the primary circuit to open the same whenever it is desired to stop the engine.

When it is desired to start the engine, the switch 27 is reversed from the position shown, whereupon the generator power circuit is opened, and the batteries 25 are series connected with the primary coil 33 and breaker points 35. The current supplied to the primary coil of the magneto by the batteries approaches the magnitude of the current normally generated therein by the rotation of the magneto magnet at normal engine running speed. Thus, in this switch position, even though the engine is being slowly cranked, the current in the primary coil approaches running levels and a normal secondary current and ensuring spark are produced as the breaker points open. Thus, with the switch in this last position, slow cranking speeds are rendered effective and, inasmuch as the engine starting torque requirement is reduced by the removal of electrical load due to the opening of the generator power circuit, the energy which must be applied at the engine starter rope handle 11' in starting the engine is substantially reduced. This, of course, facilitates starting. After the engine has been started, the switch 27 would normally be returned to the position shown in order to conserve the batteries and reconnect the load.

The electric lamp 29 has manifold utility in combination with the generator unit. When the lamp and batteries 25 are switched into the circuit including the primary coil 33 and breaker points 35, the lamp provides a visual indication of the operation of the points which is useful in diagnosing engine malfunction. Further, as may be seen in FIG. 1, the electric lamp 29 is disposed to illuminate the fuel tank filler neck 14 and the engine carburetor (not shown, but disposed generally behind the engine air intake 11"). This illumination greatly facilitates refueling the unit and making carburetor adjustments to secure proper engine operation under night time conditions when the output of the generator unit is most apt to be sorely needed.

Thus, it has been seen that the generator unit of the invention, in meeting the objectives set forth, provides a new lightweight portable source of alternating current power useful to campers and other remotely located users, as well as a standby power source for use in the event of emergency.

As various changes may be made in the form and construction herein described without departing from the spirit and scope of the invention and without sacrificing any of the advantages, it is to be understood that all matter herein is to be interpreted as illustrative and not in any limiting sense.

What is claimed is:

1. A generator unit comprising a driving means and an alternator, the alternator comprising a housing, a pair of ring-like, permanent magnets, in opposite-polarity confronting relation with each other, and rotatably mounted within said housing and adapted to be driven by said driving means, a winding including a plurality of coils within said housing, said coils being contoured in cross-section whereby an outer portion of each coil encompasses a portion of the outside diameter of each of said magnets, and an intermediate portion of each coil is disposed between the said magnets, and an inner portion of each coil encompasses a portion of the inside diameter of each of said magnets.

2. A generator unit comprising a driving means and an alternator, the alternator comprising a housing constructed at least in part of a non-conducting material, at least one ring-like, permanent magnet rotatably mounted within said housing, and adapted to be driven by said driving means, at least one stationary coil within said housing and adjacent to said magnet, the coil being contoured in cross-section whereby one portion thereof encompasses a portion of the outside diameter of said magnet, and another portion of said coil encompasses a portion of the inside diameter of said magnet.

3. An alternator comprising a housing constructed substantially of a dielectric material, a pair of ring-like permanent magnets mounted for rotation on a common axis within said housing and adapted for driving engagement with a driving means, each of said magnets having a pole of one polarity in confronting relation to a pole of opposite polarity of the other of said magnets and arranged to form an air gap therebetween, a stationary winding, a first portion of said winding disposed between the said magnets, and a second portion of said winding encompassing a portion of the outside diameter of each of said magnets.

4. An alternator according to claim 3 wherein a third portion of said winding encompasses a portion of the inside diameter of each of said magnets.

5. An alternator comprising: a housing; a shaft mounted for rotation with respect to said housing; an armature winding in fixed relation to said housing and generally disposed in a plane perpendicular to said shaft; a pair of magnets, each having a cylindrical surface, mounted for rotation on said shaft in straddled, spaced-apart relation to said armature winding and to one another and defining a magnetic flux field adapted to cut the turns of said winding when rotated with respect thereto; said armature winding comprising a pair of series-connected coils of constant cross-sectional area but of varying cross-sectional shape; said varying cross-sectional shape providing said winding with annular portions in overlapping relation to a cylindrical surface of each of said magnets, whereby the number of turns in said coils, and the generating capacity of said winding and alternator are maximized while the diameter of said winding and the overall size of said alternator are minimized.

6. The alternator of claim 5 wherein said cylindrical surfaces of said magnets are defined by bores therethrough.

7. The alternator of claim 5 wherein said magnets have inside and outside cylindrical surfaces defining inside and outside peripheries and said coils are provided with annular portions overhanging each.

8. An alternating current electrical power generating machine comprising: a housing; a fixed armature winding mounted in said housing; a shaft mounted for rotation in said housing; first and second spaced-apart cylindrical permanent magnets mounted on said shaft in straddled relation to said armature winding and defining a magnetic flux field adapted to be cut by said armature winding when said magnets are rotated with respect thereto; said armature winding comprises a plurality of series-connected coils each characterized by a varying cross-sectional shape providing portions encompassing a cylindrical surface of each of said magnets, whereby a substantial portion of leakage flux from said flux field cuts said encompassing portions of said coils to the end that the generating capacity of said machine is enhanced.

9. The machine of claim 8 wherein said housing is made of electrically non-conductive material whereby eddy current generation therein, in response to relative movement of said flux field, is eliminated.

10. The machine of claim 8 wherein said non-conductive material is a high melting point polystyrene plastic.

References Cited by the Examiner

UNITED STATES PATENTS

| | | | |
|---|---|---|---|
| 1,947,269 | 2/34 | Leibing | 310—156 |
| 1,970,498 | 8/34 | Malaussene | 310—268 |
| 2,071,536 | 2/38 | Kalin | 310—156 |
| 2,485,474 | 10/49 | Brainard | 310—156 |
| 2,545,688 | 3/51 | Critchfield et al. | 290—50 |
| 2,558,644 | 6/51 | Claytor | 290—50 |
| 2,626,367 | 1/53 | Beymer | 310—156 |
| 2,638,557 | 5/53 | Longert | 310—156 |
| 2,836,743 | 5/58 | Brown | 310—156 |
| 2,861,205 | 11/58 | Kober | 310—156 |
| 3,074,349 | 1/63 | Zimmermann | 310—43 X |
| 3,112,374 | 12/63 | Zack | 29—155.57 |
| 3,112,556 | 12/63 | Zack | 29—155.57 |

ORIS L. RADER, *Primary Examiner.*

MILTON O. HIRSHFIELD, *Examiner.*